W. EATON.
CLOTHES-LINE SUPPORTER.
No. 179,650. Patented July 11, 1876.
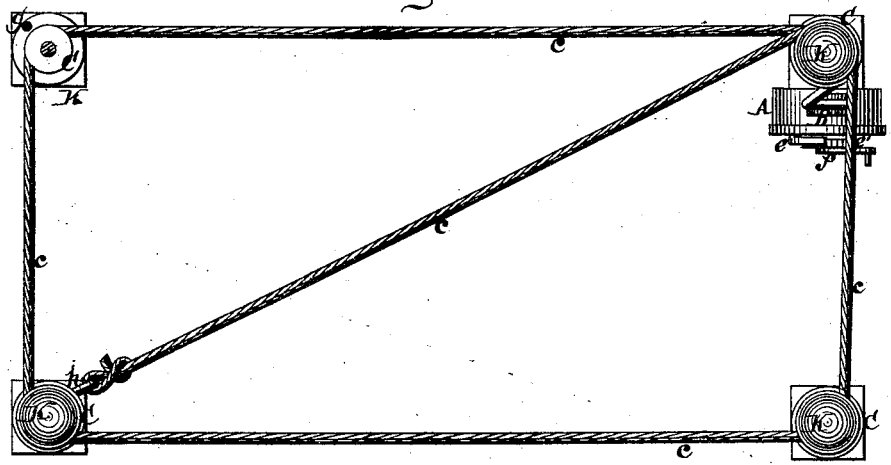
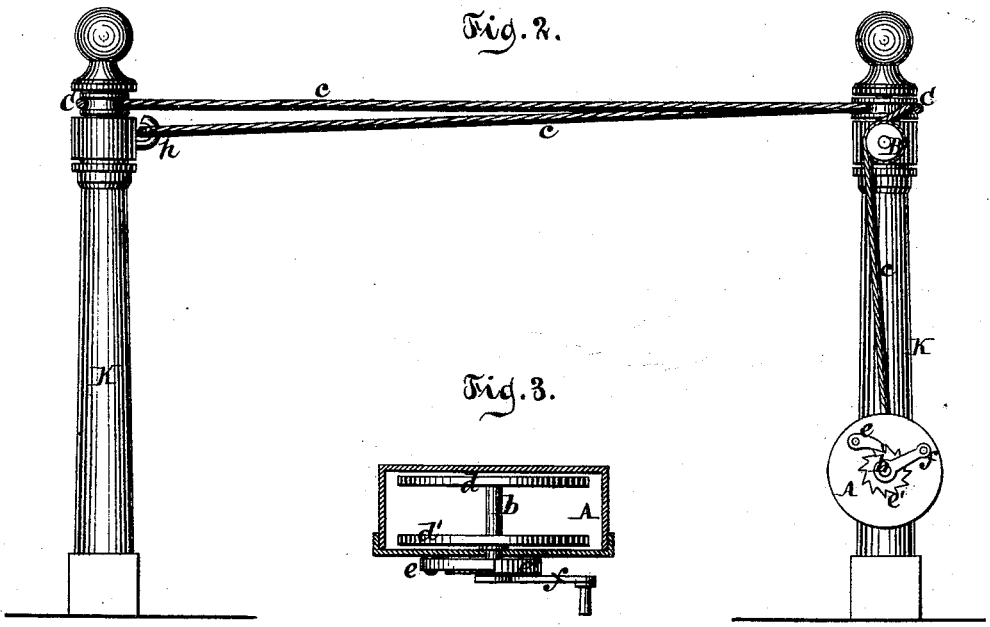
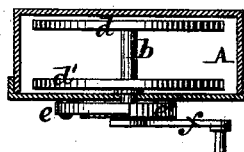
Witnesses. Inventor.
William Eaton.

UNITED STATES PATENT OFFICE.

WILLIAM EATON, OF BROOKLYN, NEW YORK.

IMPROVEMENT IN CLOTHES-LINE SUPPORTERS.

Specification forming part of Letters Patent No. 179,650, dated July 11, 1876; application filed April 25, 1876.

*To all whom it may concern:*

Be it known that I, WILLIAM EATON, of the city of Brooklyn, county of Kings and State of New York, have invented a new and useful Improved Clothes-Line Winder and Protector, which improvement is fully set forth in the annexed specification, reference being had to the accompanying drawings.

The object of my invention is to form a clothes-line winder and protector which shall be an improvement on the clothes-line attachments at present in use.

In the drawing, Figure 1 represents my improvement with the rope or line in position for hanging the clothes. Fig. 2 represents two clothes-posts with my improvement attached. Fig. 3 represents the box in which the clothes-line is placed, detached from the post.

I use a box, A, (shown in Fig. 3,) of any proper material. The box A has a shaft, $b$, running through it, on which the clothes-line $c$ is wound. The shaft $b$ has a crank, $f$, attached to it, for turning the same. The line $c$ is kept in position on the shaft $b$ by means of two cylinders or disks, $d$ and $d'$. On the outside of the box A are a ratchet and pawl, (shown in Fig. 2,) for the purpose of slackening or tightening the line $c$, as desired. This box A is attached in a vertical position, and by any suitable appliances, to one of the clothes-posts K. The end of the line projects from the box A, and is formed into a loop or knot. On the same post to which the box A is attached, near its top, is fastened vertically a pulley, B, and there is also attached to the same post, at or near its top, a horizontal pulley, C. There are also attached, at or near the tops of the other posts K, horizontal pulleys C. The line is prevented from falling off the pulley C by means of pins or guards $g$.

In putting my line $c$ in position for hanging clothes, I proceed as follows: I unwind the line $c$, which is wound on the shaft $b$ of the box A, and pass the line $c$ first around the vertical pulley B, and then pass it around the horizontal pulley C, and fasten the end of the line to the hook $h$. When the line $c$ is taken down after being used, it is wound on the shaft $b$ by means of the crank $f$.

By this arrangement of the box A, containing the shaft $b$ and cylinders $d$ and $d'$, and crank $f$, pulleys B and C, and posts K and line $c$, I make an improved clothes-line winder.

The pawl $e$ and ratchet $e'$ allows the line to be tightened or slackened, as desired. If the line is left out, exposed to the weather, the pawl $e$ is left up out of gear with the ratchet $e'$, and thus, when the line is contracted by damp weather or rain, it will draw out a portion of the line in the box A, and thus prevent the line $c$ from breaking or from pulling down the posts K, or dragging them out of position.

My improvement can be attached to ordinary clothes-posts, and the pulleys can be stationary or detachable, as desired.

Having thus described my invention, what I claim, and desire to secure by Letters Patent, is—

The combination of the box A and its attachments of shaft $b$, crank $f$, disks $d$ and $d'$, pawl $e$, and ratchet $e'$, with the posts K, provided with the pulleys B and C, hook $h$, and pins or guards $g$, and line $c$.

In testimony whereof I have hereunto signed my name this 17th day of April, 1876.

WILLIAM EATON.

Witnesses:
 LOUIS W. FROST,
 CHARLES G. COE.